June 18, 1963  C. M. HUNTER  3,094,255
DISPENSING CAPS FOR CONTAINERS
Filed Feb. 3, 1958  3 Sheets-Sheet 1

INVENTOR
Clayton M. Hunter
BY
Chas. R. Allen
ATTORNEY

June 18, 1963
C. M. HUNTER
3,094,255
DISPENSING CAPS FOR CONTAINERS
Filed Feb. 3, 1958
3 Sheets-Sheet 2
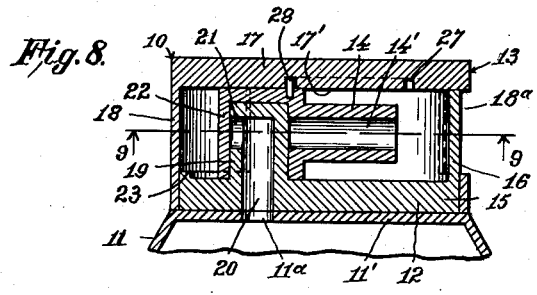
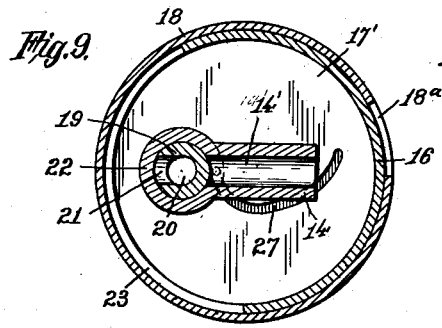
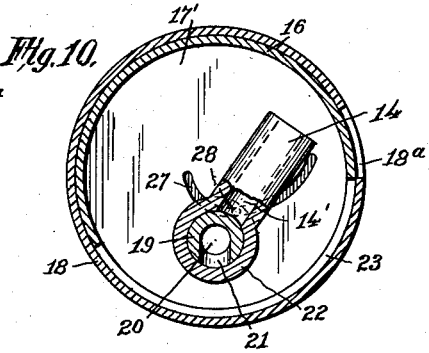
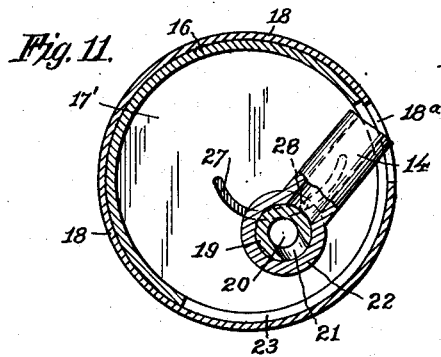
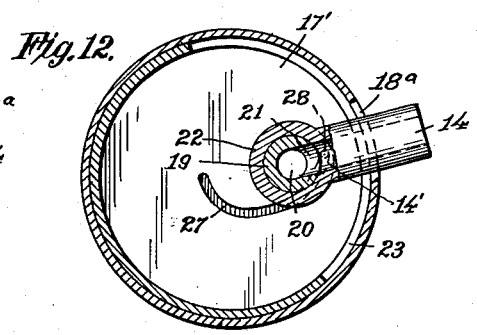
INVENTOR
*Clayton M. Hunter,*
BY *Chas. R. Allen*
ATTORNEY June 18, 1963

C. M. HUNTER 3,094,255

DISPENSING CAPS FOR CONTAINERS

Filed Feb. 3, 1958

INVENTOR
Clayton M. Hunter

BY

ATTORNEY

United States Patent Office 3,094,255
Patented June 18, 1963

3,094,255
DISPENSING CAPS FOR CONTAINERS
Clayton M. Hunter, 2430 Williams St., Augusta, Ga.
Filed Feb. 3, 1958, Ser. No. 712,857
10 Claims. (Cl. 222—507)

This invention relates to dispensing containers and, particularly, to means for controlling and directing the discharge therefrom.

Containers of the class to which the present invention is applicable generally comprise a compressible body having a discharge aperture, usually at one end thereof, from which the contents of the container may be discharged by pressure applied to the walls of the container; or the container may consist of a body, either flexible or non-flexible, having a valve-controlled discharge aperture through which the contents of the container may be discharged by internal pressure after the valve has been manually opened. In the latter case the container may be either compressible or non-compressible.

The object of the present invention is to provide a container equipped with a discharge spout in combination with a housing normally entirely enclosing said spout, and means whereby the end of said discharge spout may be readily projected beyond said housing, or retracted into said housing, by relative rotation of said container and housing.

A further object of the invention is to provide a container of the class stated and of the type wherein the content is discharged by internal pressure, and having a pivotally-mounted, transversely-extending discharge spout, and a manually operable valve controlling the passageway to said spout; in combination with a housing for said spout, said housing including relatively rotatable inner and outer members, the inner member preferably being fixed to the container; means whereby said spout may be projected from and retracted into said housing upon relative rotation of said members, and means on said outer member for manually operating said valve only when said spout is in projected position.

Other objects will appear hereinafter.

The invention will be more readily understood by reference to the accompanying drawings, in which:

FIG. 8 is a vertical section, similar to FIG. 1, illustrating a modified form of the means for projecting and retracting the spout; wherein a pin, which is fixed to the spout member eccentrically of the axis of rotation thereof engages a a cam groove provided in the outer member of the housing;

FIG. 9 is a horizontal section on the line 9—9 of FIG. 8, with the spout illustrated in fully retracted position;

FIG. 10 is a similar view illustrating an intermediate stage in the operation of projecting the spout;

FIG. 11 is a similar view illustrating a further advanced stage;

FIG. 12 is a similar view with the spout fully extended;

Figure 1:
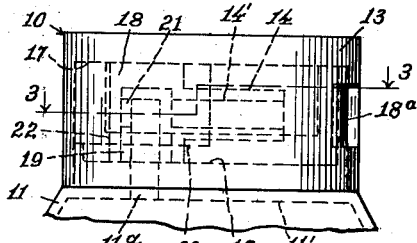
FIG. 1 is an elevation of a discharge-controlling device embodying one form of the invention, the same being illustrated as applied to a container, and with the spout in fully retracted position.
Figure 2:
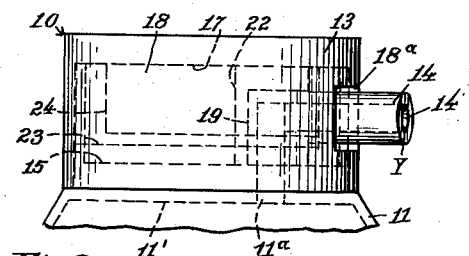
FIG. 2 is a similar view illustrating the spout fully extended.

Referring particularly to FIGS. 1 to 7 inclusive of the drawings, 10 indicates the housing which is mounted upon a container 11. The housing 10 comprises generally inner and outer cylindrica members 12 and 13 respectively having limited relative rotation, and 14 indicates the discharge spout which is swingingly mounted eccentrically within the housing, with the pivoted end thereof in communication with the interior of the container when the spout is fully projected, as will be fully described hereinafter.

In operating the device, either of the members 12 or 13 may be held, or remain, substantially stationary while the other member is rotated, either to project or to retract the spout; or both members 12 and 13 may be simultaneously rotated in opposite directions as found desirable or convenient. However, in the drawings the several figs. illustrating the successive stages in the operation of the device show the rotation of the inner member 12 together with the container to which it is fixed, while the outer member 13 is held stationary, in order to more clearly illustrate the operation of the device.

The inner member 12 comprises a base plate 15 which is fixed to the end wall 11' of the container 11, and a cylindrical wall 16 extending outwardly therefrom; and the outer member 13 comprises a cap plate 17 and a depending cylindrical wall 18 preferably integral therewith and which fits snugly but rotatably about the outer face of wall 16, and entirely closes the device when the spout is retracted.

Figure 6:
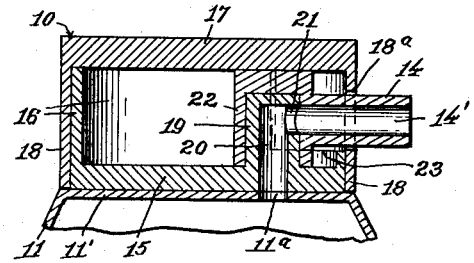
FIG. 6 is a section on the line 6—6 of FIG. 5.
Figure 7:
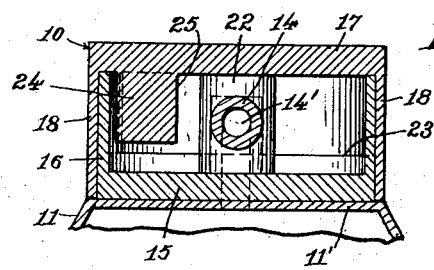
FIG. 7 is a vertical section on the line 7—7 of FIG. 3.
Figure 13:
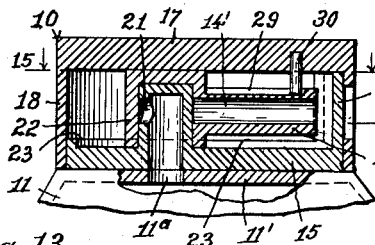
FIG. 13 is a vertical section illustrating a further modification, with the spout fully retracted.
Figure 14:
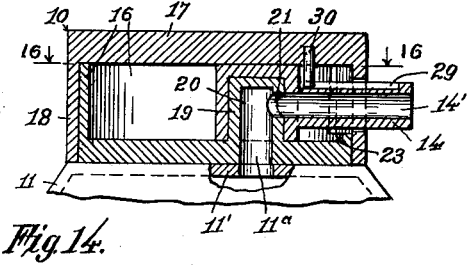
FIG. 14 is a similar view with the spout fully extended.
Figure 15:
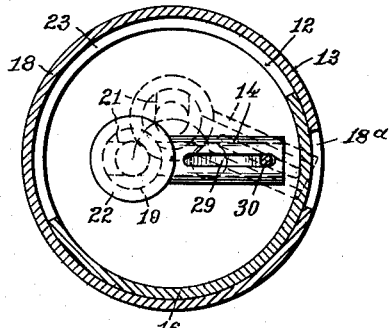
FIG. 15 is a section on the line 15—15 of FIG. 13, illustrating in full lines the spout as fully retracted, and in intermediate position of the spout indicated in dotted lines.
Figure 16:
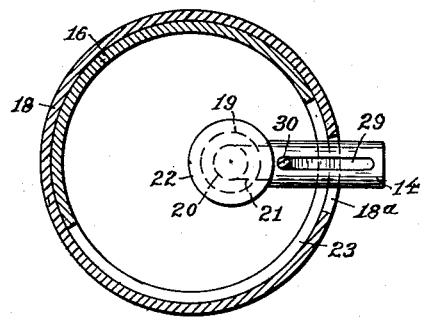
FIG. 16 is a section on the line 16—16 of FIG. 14.

Projecting upwardly from the base plate 15, and preferably integral therewith, is a fixed tubular stud post 19 having a bore 20 in open communication with the interior of the container 11 through a port 11ª, as illustrated in FIG. 6. A discharge port 21 extends radially outwardly, with relation to the housing, from the upper end of said bore, said port 21 being preferably substantially midway between the top and bottom plates 12 and 15. The spout 14 is provided with a sleeve 22 by which it is swingingly mounted upon the post 19, and fits snugly between the upper and lower plates 17 and 15 of the housing, as illustrated in FIG. 6; and the bore 14' of the spout registers with the port 21 only when the spout is in the projected position extending through the port 18ª in the wall 18.

The sector of the inner wall 12 of the housing adjacent the stud post 19, and for a considerable distance each side thereof, is reduced in height as indicated at 23; in order to provide an aperture above said portion 23 through which the spout may freely swing above said reduced portion 23 as said spout is being projected and retracted. The remainder of the wall 12 extends upwardly into contact with the under face of the top plate 17, and closes the port 18ª when the spout is retracted.

Depending from the top plate 17 is a cam member 24 which guides the discharge end of the spout 14 toward the port 18ª as the housing members 12 and 13 are relatively rotated to project the spout. Said cam member 24 may be of any preferred form; but as illustrated in FIGS.

1 to 7 inclusive of the drawings, may consist of a block having a cam face 25 which terminates at 26 adjacent the port 22.

Figure 3:
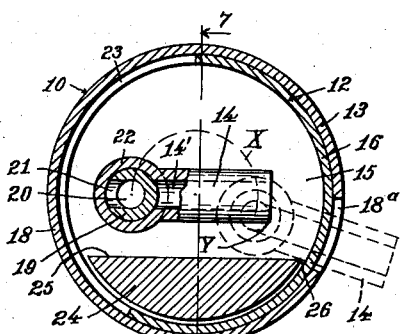
FIG. 3 is a section taken on substantially the line 3—3 of FIG. 1.
Figure 4:
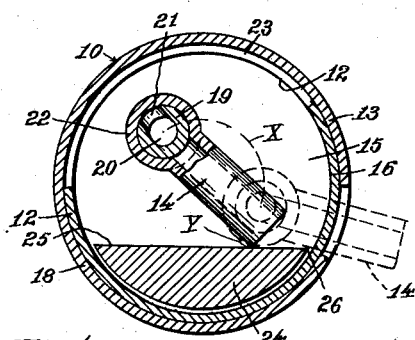
FIG. 4 is a similar view illustrating an intermediate stage in the projection of the spout.
Figure 5:
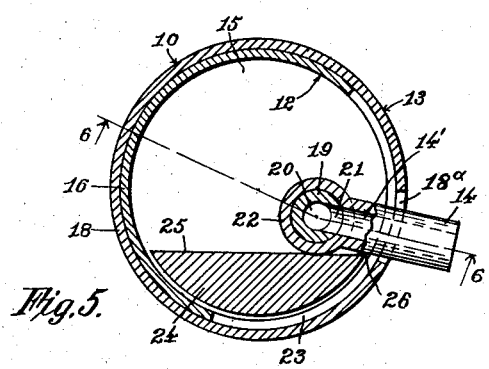
FIG. 5 is a similar view illustrating the spout fully projected.

As before stated, either of the housing members 12 or 13 may be rotated; or both may be simultaneously rotated in opposite directions; but in FIGS. 3, 4, and 5 it is assumed that the inner member is rotated and that the outer member is held against rotation. As the inner member 12 rotates, the stud post 19 moves in an arc defined by the broken line X in FIGS. 3 and 4; which causes the discharge end Y of the spout to engage the cam face 25, and further rotation causes the end Y to slide along the cam face to, and through, the port 22, as illustrated in FIG. 5. It will be noted that as the operation progresses, the portion 23 of wall 16, which is reduced in height, moves into position to open the port 18ª; and that the sleeve 22 will contact the cam face 25 and stop further rotation. Also, as illustrated in FIGS. 3 and 4, the sleeve 22 serves as a valve to maintain the port 21 closed until the spout is projected. Retraction of the nozzle is effected by rotating the housing members in the opposite direction from that used in projecting the same.

FIGS. 8 to 12 inclusive illustrate a modification of the means for guiding the spout 14 to the post 22. In this form of the invention, the housing members 12 and 13 are substantially the same as in the preceding form; but the cam block 24 is dispensed with and the under face 17' of the top plate 17 is provided with a curved cam groove 27 to receive an upwardly projecting member such as a lug or pin 28 arranged eccentrically on the upper end of sleeve 22. It is obvious that upon relative rotation of the housing members, the nozzle 14 will be swung toward, and through, the port 22, as the wall 16 moves to clear said port. Otherwise, the construction is substantially the same as in the form illustrated in FIGS. 1 to 7 inclusive.

A further modification is illustrated in FIGS. 13 to 16 inclusive, wherein the spout 14 is provided in its upper portion with a longitudinally extending groove 29 to receive the lower end of a pin 30 depending from the top plate 17 adjacent the port 21. The operation of this form of the invention will be obvious without further description.

Figure 17:
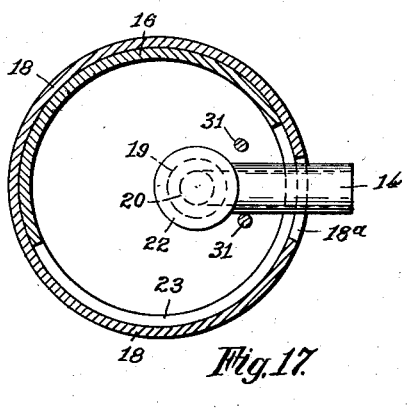
FIG. 17 is a view similar to FIG. 16, illustrating a further modification of the cam.

In FIG. 17 a further modification is shown, wherein a pair of pins 31 extend downwardly from the top plate 17 to engage opposite sides of the spout 14; said pins being spaced apart sufficiently to avoid cramping the spout 14 when at an angular position between the same. The operation of this form of the invention is obvious.

Figure 18:
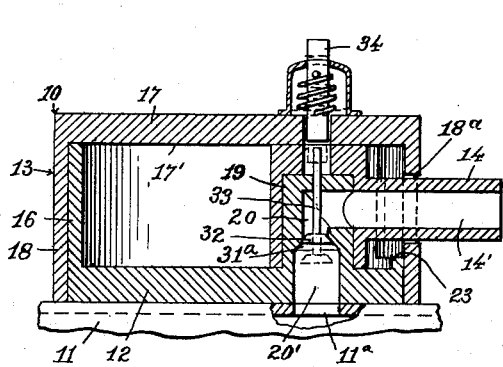
FIG. 18 is a vertical section of a further modification illustrating the invention applied to a container wherein the content thereof is extruded by internal pressure through a port provided with a manually controlled valve.

FIG. 18 illustrates the invention as applied to a container from which the content is discharged through a valve controlled port by internal pressure. As illustrated in said FIG. 18, the lower portion of bore 20 of the stud post 19 is enlarged in diameter, as at 20', and is positioned above the discharge port 11ª of the container; and the upper end of said enlarged portion 20' is formed with a valve seat 31a for a manually operable discharge valve 32. The valve 32 is normally held seated by the internal pressure of the container, and is provided with an upwardly extending valve stem 33 which terminates below the level of the top plate 17 so as not to interfere with the normal relative rotation of the housing members 12 and 13. Mounted upon the upper plate 17 is a manually operable, spring retracted, plunger 34 which is brought into alignment with the valve stem 33 as the spout 14 is projected, and with the lower end of said plunger 34 terminating above the under face 17' of the housing when in retracted position. When the housing members 12 and 13 are relatively rotated to project the spout 14, in any of the foregoing methods, for example, the methods shown in FIGURES 1 through 6, the plunger 34 is brought into alignment with the valve stem 33, and pressure on said plunger 34 will open the valve and permit the content of the container 11 to be discharged through the spout 14. Upon release of pressure on the plunger 34, the internal pressure in the container 11 will seat the valve and stop the discharge from the spout 14; after which the housing members 12 and 13 may be relatively rotated to retract the nozzle 14 and close the port 18ª.

I claim:
1. A container, a housing on said container comprising inner and outer relatively rotatable members, said inner member consisting of a base plate fixed to a wall of said container and an outwardly extending inner cylindrical wall; and the outer member comprising a cap plate and a depending cylindrical wall fitting rotatably about the first said wall, a perpendicular tubular post eccentrically positioned on said base plate and having a bore communicating at the inner end thereof with the interior of said container, an upper end portion of said post having a port extending radially outwardly with relation to said housing, a discharge spout pivotally mounted on the end of said post and having a bore registering with said port when said spout is projected, alignable spout receiving openings in said cylindrical walls; and means for projecting and retracting said spout upon relative rotation of said housing members.

2. A container, a housing on said container comprising inner and outer relatively rotatable members, said inner member consisting of a base plate fixed to a wall of said container and an outwardly extending cylindrical wall, a perpendicular outwardly extending post eccentrically positioned on said base plate, and having a bore communicating at the inner end thereof with the interior of said container, an upper end portion of said post having a discharge port extending radially outwardly with relation to said housing, said inner wall having a circumferentially broad port adjacent said post, a discharge spout pivotally mounted on the end of said post and having a bore registering with said discharge port when said spout is projected, and said outer member comprising a cap plate and a depending cylindrical wall fitting rotatably about said inner cylindrical wall and having a port of sufficient size to receive said spout, and a cam on said outer member for guiding the outer end of said spout toward and through said port in said outer member as said housing members are relatively rotated.

3. A device as set forth in claim 2 in which said cylindrical walls each close the port in the other cylindrical member when the spout is retracted.

4. A container, a housing on said container comprising inner and outer relatively rotatable members, said inner member consisting of a base plate fixed to a wall of said container and an outwardly extending inner cylindrical wall; and said outer member comprising a cap plate resting in the upper edge of said inner wall and a depending cylindrical wall fitting rotatably about the first said wall, a perpendicular tubular post eccentrically positioned on said base plate and having a bore communicating at the inner end thereof with the interior of said container, an upper end portion of said post having a port extending radially outwardly with relation to said housing, a laterally extending spout having a sleeve rotatably mounted on said post and fitting snugly between said base plate and said cap plate, and provided with a bore for registering with said radially extending port in said post when in extended position.

5. A container, a housing on said container comprising inner and outer relatively rotatable members, one of said members including a base plate and a cylindrical wall, the other of said members including a cap plate and a cylindrical wall, said cylindrical walls being disposed in closely fitting telescoped concentric relation, a tubular post mounted on and opening downwardly through said base plate, said tubular post being eccentrically positioned, a spout, means rotatably mounting said spout on said post in communication with the interior of said post, each of said cylindrical walls having a lateral port, said ports being registerable for receiving said spout, and means for projecting and retracting said spout through said lateral ports upon relative rotation of said members.

6. The device of claim 1 wherein said means for projecting and retracting said spout includes a cam groove on the inner face of said cap plate, and an upwardly extending member on said spout eccentric to the center of rotation of said spout and engaging in said cam groove.

7. The device of claim 1 wherein said means for projecting and retracting said spout includes a longitudinal groove in the upper face of said spout, and a pin depending eccentrically from the cap plate and engaging in said groove.

8. The device of claim 1 wherein said means for retracting said spout includes a pair of pins depending from said cap plate upon opposite sides of said spout to guide said spout.

9. The device of claim 1 together with a valve seat in said post below said post port, a valve cooperating with said valve seat and having an upwardly extending valve stem terminating below said cap plate, and a spring retracted plunger on said cap plate alignable wtih said valve stem when said spout is fully projected for operating said valve.

10. In a container which has a wall provided with an opening registered with the interior of the container, a closure comprising a closure cap, means attached to said wall mounting said closure cap for rotation on the container, said closure cap enclosing a chamber, a tubular member attached to said wall and located in said chamber and in registry with said opening in said wall, a hollow spindle mounted for rotation on said tubular member, said tubular member having a port therein, said hollow spindle having side walls provided with an opening, a spout in registry with the opening in said side walls of said hollow spindle, portions of the side walls of said spindle adapted to close said port, a passageway in said spout adapted to align with said port to establish port closing and port opening positions respectively, means connected with said closure cap and engageable with said spout eccentrically of its mounting whereby said spout is rotated when said cap is rotated with respect to the container, and said cap having a side wall provided with an opening through which said spout is projected when said port opening position is achieved.

References Cited in the file of this patent

UNITED STATES PATENTS 1,079,710   Mason ---------------- Nov. 25, 1913